United States Patent [19]
Jasinetzky et al.

[11] Patent Number: 6,093,478
[45] Date of Patent: Jul. 25, 2000

[54] COMPOSITE MEMBER

[75] Inventors: Arthur Jasinetzky, München; Hans-Peter Wirtz, Köln, both of Germany

[73] Assignees: Firma Ford-Werke AG; Firma Druckgusswerk Mössner GmbH

[21] Appl. No.: 08/844,710

[22] Filed: Apr. 18, 1997

[30] Foreign Application Priority Data

| Apr. 20, 1996 | [DE] | Germany | 196 15 783 |
| Jul. 4, 1996 | [DE] | Germany | 196 26 974 |

[51] Int. Cl.$^7$ ...................................................... B32B 9/00
[52] U.S. Cl. ......................... 428/212; 428/192; 428/217; 428/223; 428/548; 428/589; 428/590; 428/615; 416/244 R; 415/197; 415/214; 264/46.7; 264/259; 264/273; 60/345; 60/362
[58] Field of Search ................................... 428/212, 192, 428/217, 223, 548, 580, 590, 615; 60/345, 362; 415/200, 197, 214; 416/241 R, 244 R; 264/273, 259, 275, 46.7

[56] References Cited

U.S. PATENT DOCUMENTS

| 3,271,845 | 9/1966 | Breher | 29/157.1 |
| 4,296,063 | 10/1981 | Sendo et al. | 264/273 |
| 4,580,757 | 4/1986 | Dobhan et al. | 249/88 |
| 5,094,076 | 3/1992 | Henricks | 60/345 |

FOREIGN PATENT DOCUMENTS 63141712  6/1988  Japan .

*Primary Examiner*—William Krynski
*Assistant Examiner*—Abraham Bahta
*Attorney, Agent, or Firm*—Robert W. Becker & Associates

[57] ABSTRACT

A composite member has a diecast part and a hub part that consists of a harder material than the diecast part. The diecast part is attached to the hub part by diecasting within a diecast mold. The hub part has at least one end face. The at least one end face has an annular sealing projection that, during diecasting of the diecast part, rests at a surface of the diecast mold and is deformed by the diecast mold.

13 Claims, 3 Drawing Sheets

COMPOSITE MEMBER

BACKGROUND OF THE INVENTION

The present invention relates to a composite member comprised of a diecast part and a hub part which is of a harder material than the diecast part and to which the diecast part is diecast within a diecast mold.

Such a composite member is known for example from U.S. Pat. No. 5,094,076. This composite member comprises a hub part surrounded by a plastic part attached to the hub part by an injection molding process. The plastic part is injection-molded during manufacture of the composite member whereby a transmission cone comprises abutments for sealing plates which are to prevent that the injection molding material reaches the inner areas of the hub part. It is disadvantageous that separate sealing plates are required which must withstand the injection molding pressure.

When, on the other hand, a diecast part, for example, is to be manufactured of aluminum, a diecasting pressure of 400 to 600 bar is required which makes necessary a correspondingly strong embodiment of the sealing plates.

It is furthermore disadvantageous in regard to the aforementioned solution that with the closed embodiment of the composite member the roller overrunning clutch is completely sealed within the hub part so that lubrication at a later point in time cannot be performed without destroying the composite member, and it is thus impossible to connect the roller overrunning clutch to the lubricant circuit of a hydrokinetic torque convertor. Furthermore, the additional arrangement of sealing plates requires a precise adjustment, to be achieved with a special cone structure, in order to avoid unbalance.

The roller overrunning clutch requires furthermore that the areas of the hub part facing the rollers are as hard as possible since with the special construction of a roller overrunning clutch considerable radial forces must be transmitted so that a hardened embodiment is necessary especially in order to prevent premature wear.

It is possible to manufacture the sealing plate according to U.S. Pat. No. 5,094,076 of a comparatively soft material that is thus suitable for sealing purposes. However, the sealing effect is over all dissatisfactory since by providing the additional component there is practically also an additional sealing location present, and the function of the sealing plate thus depends greatly on the exact machining of the hub part, respectively, the uniform pressing force via the abutments of the cone structure provided thereat.

It is therefore an object of the present invention to provide a composite member of the aforementioned kind that, despite wear resistance of the hub part, allows for a safe sealing during injection casting or diecasting of the diecast part.

SUMMARY OF THE INVENTION

The composite member according to the present invention is primarily characterized by.

A diecast part;

A hub part that consists of a harder material than the diecast part;

The diecast part attached to the hub part by diecasting within a diecast mold;

The hub part having at least one end face;

The at least one end face having an annular sealing projection that, during diecasting of the diecast part, rests at a surface of the die cast mold and is deformed by the diecast mold.

The hub part preferably has two of the end faces positioned opposite one another.

The hub part has working areas spaced from the annular sealing projections. The working areas form a part of a cam contour of the outer race of an overrunning clutch. The working areas are hardened and the annular sealing projections are not hardened.

Expediently, the annular sealing projections are positioned at radially outer areas of the end faces, wherein the end faces further comprise conically slanted surfaces surrounding radially outwardly the annular sealing projections and forming a border surface to the die cast part.

The conically slanted surfaces have a cone angle of 30° to 85° relative to the axis of the hub part. Preferably, the cone angle is 45° to 75° and, most preferred, is 65°.

The diecast part is radially inwardly limited by the annular sealing projections and extends completely radially outwardly relative to the annular sealing projections.

The annular sealing projection has preferably a cross-sectional shape selected from the group consisting of a triangle, a sawtooth, or a rounded bead. The annular sealing projection has preferably a crest rounded with a crest radius.

The sealing projection preferably projects from the end face by an amount of 0.35 mm to 1 mm, preferably by an amount of 0.2 mm to 0.5 mm, and most preferred by an amount of 0.3 mm.

The hub part forms an outer race of the overrunning clutch and comprises an inner cam surface. It has an outer periphery having a plurality of radially extending plate-shaped projections extending across a breakage-susceptible area of the outer race for reinforcing the area. The plate-shaped projections provide improved anchoring of the diecast part at the hub part in the torque-transferring direction.

The inventive manufacture of a composite member surprisingly makes it possible, despite the enormous pressure during injection of the diecasting material, such as magnesium or aluminum or other suitable light metal alloys, a safe sealing of the hub part relative to the diecast mold. With a correspondingly required closing force of the mold, the inventive sealing projection or projections can be deformed whereby the deformation can be elastic as well as plastic and is preferably partially plastic and partially elastic.

It is especially advantageous that due to this deformation practically automatically any surface flaws of the diecast mold are compensated and securely sealed. This reduces the requirements in regard to the surface quality of the die tools and thus reduces the manufacturing costs.

Surprisingly, this measure can also be used when a roller overrunning clutch including the hub part is provided which requires very hard working surfaces. These working surfaces are hardened so that the hub part itself is provided only in areas where it is necessary with a sufficiently great hardness.

Preferably, the sealing surfaces are annular sealing lips and extend thus annularly on opposite end faces of the hub part. The closing force of the mold thus results almost automatically in a centering and optimization of the sealing abutment between the mold or die tools, i.e., especially the mold halves, and the hub part. The required closing force for the mold is not increased by the inventive sealing projections.

Since the hub part at its axial end faces is provided with annular sealing beads, which can be directly loaded by the two halves of the diecast mold and which are plastically deformable for the purpose of sealing, a flawless sealing action is provided with minimal expenditure without requiring, for example, at the diecast mold halves expensive and complicated sealing arrangements designed for withstanding a plurality of working cycles.

The hub part, according to a preferred embodiment of the invention, is the outer race of a roller overrunning clutch for the guide member of a hydrokinetic torque convertor and comprises, based on a conical phase, at its axial end faces annular sealing beads or sealing projections with sawtooth-shaped or triangular cross-section.

According to a further embodiment, the hub part is in the form of the outer race of a roller overrunning clutch and is provided with radially projecting plate-shaped projections at the radial outer periphery. These projections reinforce the breakage-susceptible cross-section in the area of the cutouts for the rollers of the roller overrunning clutch.

It is furthermore especially advantageous when the sealing projections are provided adjacent to conical slanted surfaces. When injecting the diecasting material, the tapering cross-sectional area extending toward the sealing projection thus provides a rebounding or deflector surface so that no extremely high dynamic pressure acts on the sealing.

The sealing projection or annular bead can have any desired construction that is suitable for embodying a sealing that becomes effective by being deformed. For example, the sealing projection can have a substantially sawtooth-shaped cross-section with preferably rounded tips or crests.

It is understood that the oversize of the unloaded sealing projection relative to the die tools can be adapted within wide ranges to the respective requirements. Preferably, the oversize is selected such that at least a considerable part, for example, 20%, of the closure force, which, for example, is approximately 10 GN (1,000 t), is received and compensated by the sealing projection and is used as a sealing force.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 5.

Figure 1:
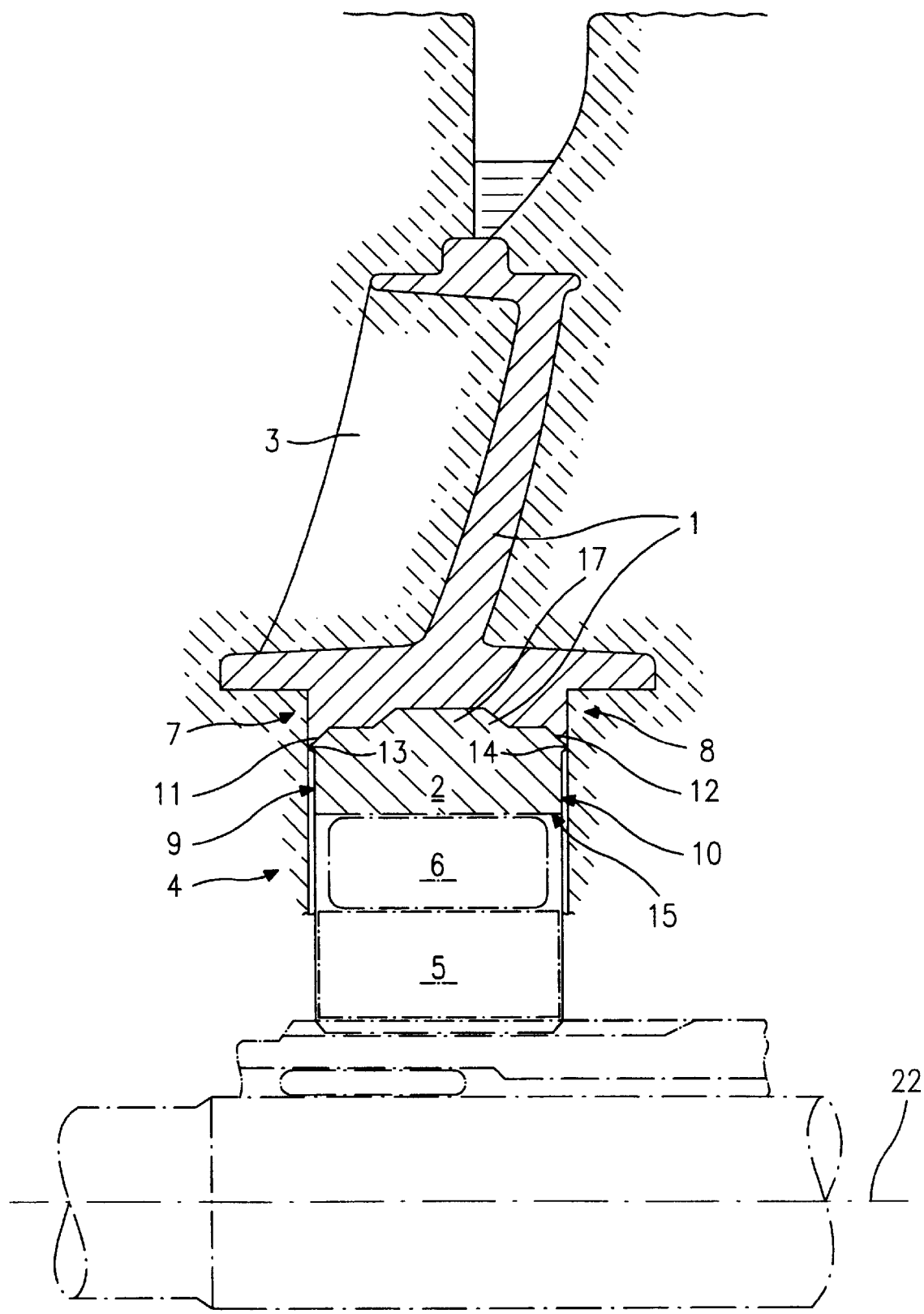
FIG. 1 shows a vertical cross-section of a guide member of a hydrokinetic torque convertor that is formed by a hub part of harder material and a diecast part of a lighter weight material and whereby the components of the roller overrunning clutch not directly belonging to the composite member are indicated only in dash-dotted lines.

FIG. 1 shows the inventive composite member 1 in radial section. It is comprised of a hub part 2 of a harder material and a diecast part 3 of a more lightweight and/or softer material.

The hub part 2 forms the outer race of a roller overrunning clutch 4, further components of which such as the inner race 5 and the rollers 6 are indicated only in dash-dotted lines.

The reference numerals 7 and 8 show areas of the two mold halves of a two or multiple part diecast mold into which the hub part 2 is inserted in order to be connected with softer or more lightweight material, for example, plastic material or aluminum, by diecasting in order to produce the composite member 1.

Inventively, the axial end faces 9 and 10 of the hub part 2, beginning at the conical chamfer or slanted surface 11 and 12, are provided with sealing projections 13 and 14 of a substantially triangular cross-section that are loaded directly by the diecast mold halves. The conical slanted surfaces 11 and 12 extend in the preferred embodiment at an angle of approximately 65° to an axis 22 of the hub part 2.

The hub part 2, that in the present case forms the outer race of a roller overrunning clutch, is comprised of steel and is provided with an inner cam contour 15 that is hardened within the working areas 23 and 24.

The hardening is performed preferably before diecasting the diecast part 3, whereby the hardening depth can be adjusted in wide ranges to the respective requirements. The depth is preferably approximately 2 mm for the working area 24 for guiding the rollers 6 of the roller overrunning clutch and approximately 3 mm within the working area 23 for supporting the inner race 5.

In the area of the outer periphery and in the area of the annular beads 13 and 14, the steel material remains unhardened so that it is deformable by the very high closing pressure of the diecast mold halves 7 and 8 to thus provide a reliable sealing action.

Figure 2:
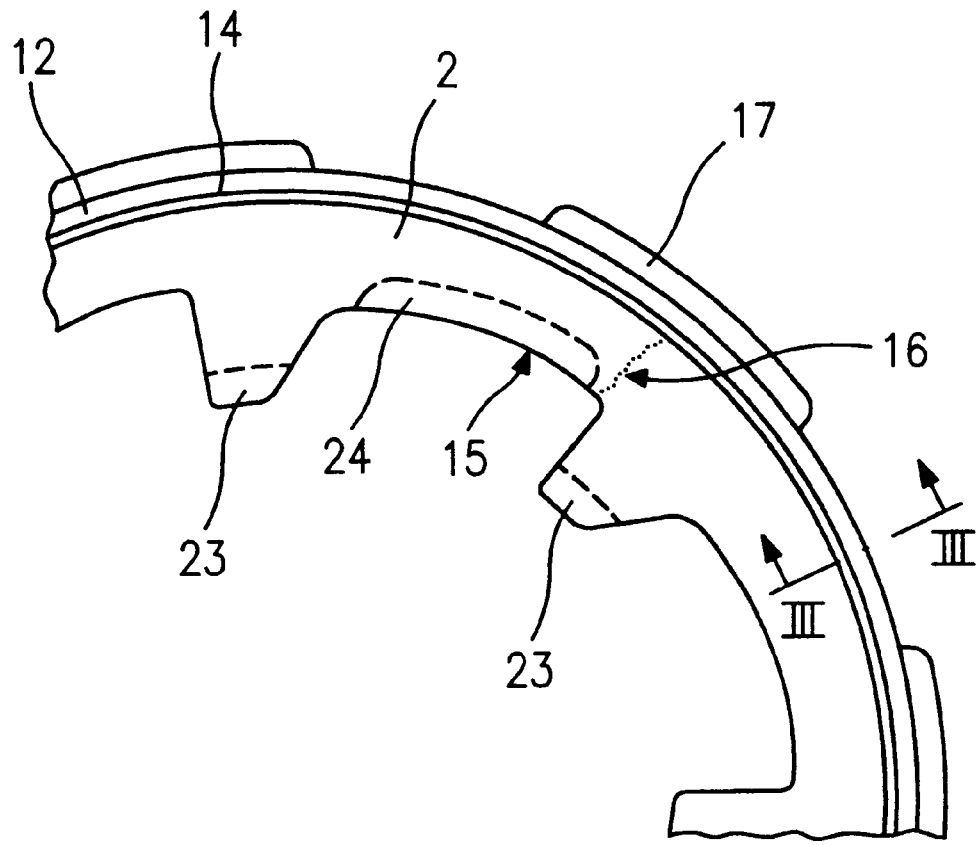
FIG. 2 is a partial view of the hub part in the form of an outer race of the roller overrunning clutch.
Figure 3:
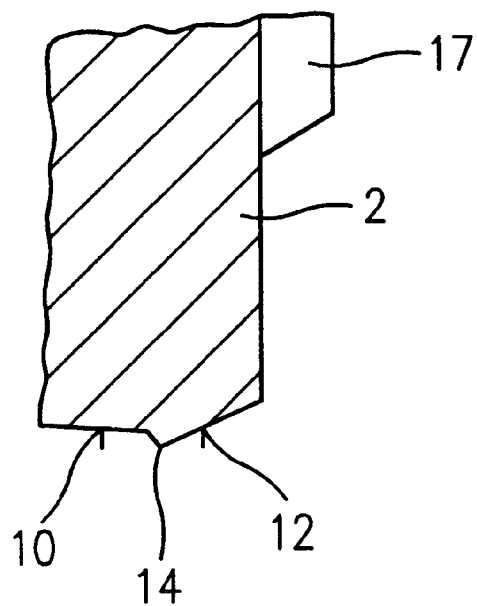
FIG. 3 shows an enlarged partial section along the line III—III of FIG. 2.

As can be seen in FIG. 2, the cam contour 15 at the outer race 2 of the roller overrunning clutch 4 results in a breakage-susceptible cross-section in the area of arrow 16. By providing a plurality of radially outwardly projecting plate-shaped projections 17 that span this area, this breakage-susceptible cross-section can be reinforced in a favorable manner.

At the same time, the plate-shaped radial projection 17 provide a favorable anchoring of the diecast part at the hub part in order to transmit the torque occuring at the diecast part safely onto the hub part 2.

An aluminum or a magnesium alloy can preferably be used for manufacturing the diecast part, but it is also possible to use a suitable plastic material.

By the diecasting step, the hub part is annularly loaded with pressure. After cooling of the diecast mold, an expansion due to the reduced diecast injection pressure occurs. This expansion which may be, for example, ¹/₂₀ mm. In order to compensate for this diameter change, it is possible to use from the beginning a hub part 2 with a correspondingly adjusted/selected diameter or a subsequent post-manufacturing grinding step can be performed.

Inventively, an optimal adjustment of the materials used with respect to their weight/strength ratio can be realized by directly diecasting the inventive sealing lips or sealing projections 13 and 14 despite the suggested use of hardened working areas 23 and 24.

The hardening can be performed, when needed, after completion of the diecasting process, in this context, an inductive hardening is preferred. It is understood that for such a solution a post-manufacture grinding step may be required.

Figure 4:
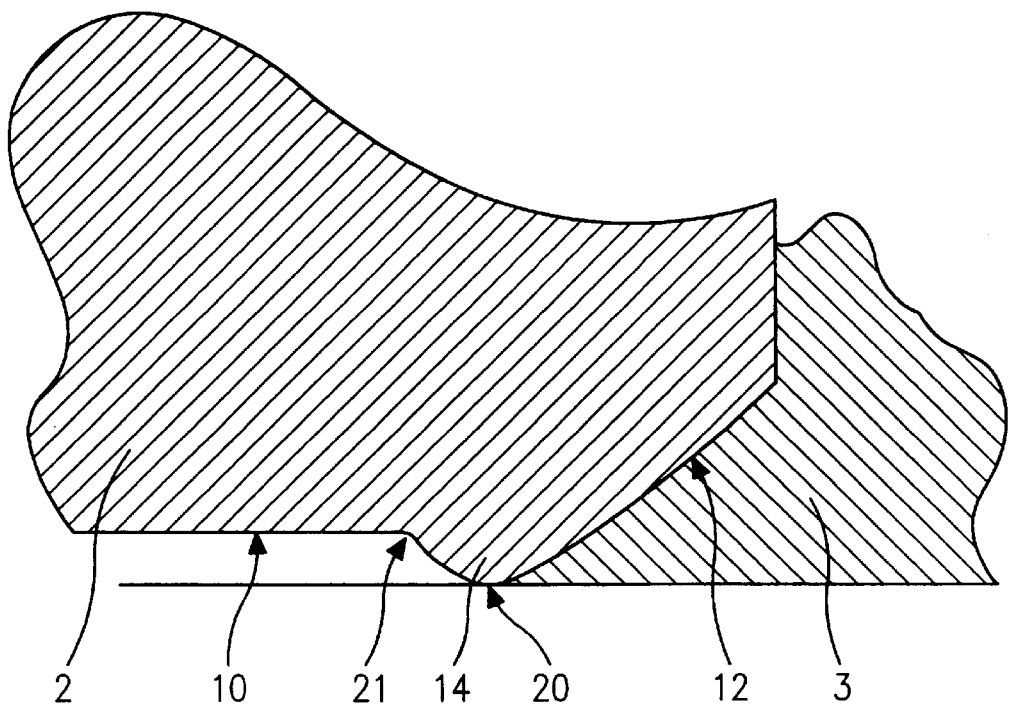
FIG. 4 shows an enlarged partial section of a modified embodiment of FIG. 3 before deformation by the mold halves.

In the embodiment represented in FIG. 4, a radius 20 is shown at the crest of the sealing projection 14. This embodiment allows, in comparison to a sawtooth-shaped construction of the sealing projection 14, a somewhat reduced surface pressure and a somewhat greater compatibility with respect to manufacture-based tolerances. In addition to the outer radius 20 at the crest of the sealing projection 14, in the transition area into the end face 10 an inner radius 21 is provided.

The entire area of the hub part 2 shown in FIG. 4 is unhardened, in contrast to the working surfaces or working areas 23 and 24 shown in FIG. 2.

Figure 5:
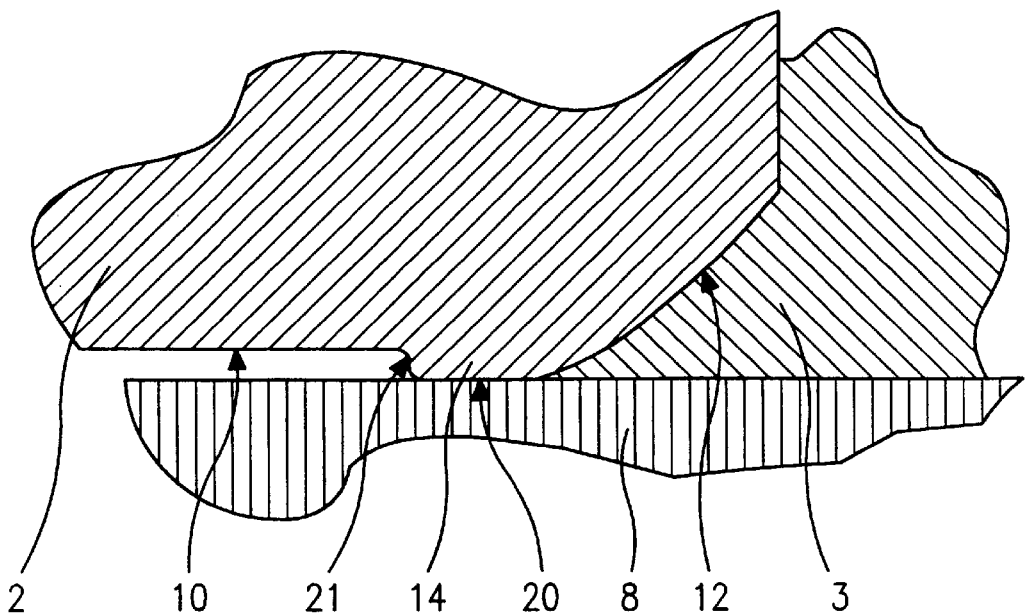
FIG. 5 an enlarged partial section of the embodiment of FIG. 3 showing the deformation caused by the mold halves.

From FIG. 5 it can be taken in which manner the sealing projection 14 is deformed by the closing pressure of the diecast mold 8.

It is understood that the present invention is not limited to the use in connection with a roller overruning clutch. In general, it is suitable for any desired application within the drive train of rotatably movable parts which serve for force transmission, whereby, in general, the greatest forces to be transmitted are guided into the hub, respectively, the shaft clamped thereat. The inventive solution is also usable with other composite parts in which, despite attaching by diecasting a part of a light-weight material, hard (hardened) and thus wear-reduced working areas are required.

The present invention is, of course, in no way restricted to the specific disclosure of the specification and drawings, but also encompasses any modifications within the scope of the appended claims.

What we claim is:

1. A composite member comprised of:
   a diecast part;
   a hub part that consists of a harder material than said diecast part;
   said diecast part attached to said hub part by diecasting within a diecast mold;
   said hub part having at least one end face;
   said at least one end face having a unitary annular sealing projection;
   said hub part and said unitary annular sealing projection consisting of a same material;
   wherein said unitary annular sealing projection, during diecasting of said diecast part, rests at a surface of said diecast mold and is deformed by the diecast mold.

2. A composite member according to claim 1, wherein said hub part has two of said end faces positioned opposite one another.

3. A composite member according to claim 2, wherein:
   said hub part has working areas spaced from said annular sealing projections;
   said working areas form a part of a cam contour of an outer race of an overrunning clutch;
   said working areas are hardened and said annular sealing projections are not hardened.

4. A composite member according to claim 2, wherein said annular sealing projections are positioned at radially outer areas of said end faces, wherein said end faces further comprises conically slanted surfaces surrounding radially outwardly said annular sealing projections and forming a border surface to said diecast part.

5. A composite member according to claim 4, wherein said conically slanted surfaces have a cone angle of 30° to 85° relative to an axis of said hub part.

6. A composite member according to claim 5, wherein said cone angle is 45° to 75°.

7. A composite member according to claim 6, wherein said cone angle is 65°.

8. A composite member according to claim 2, wherein said diecast part is radially inwardly limited by said annular sealing projections and extends completely radially outwardly relative to said annular sealing projections.

9. A composite member according to claim 1, wherein said annular sealing projection has a cross-sectional shape selected from the group consisting of a triangle, a sawtooth, or a rounded bead and wherein said annular sealing projection has a crest rounded with a crest radius.

10. A composite member according to claim 1, wherein said sealing projection projects from said end face by an amount of 0.35 mm to 1 mm.

11. A composite member according to claim 1, wherein said sealing projection projects from said end face by an amount of 0.2 mm to 0.5 mm.

12. A composite member according to claim 1, wherein said sealing projection projects from said end face by an amount of 0.3 mm.

13. A composite member according to claim 1, wherein said hub part forms an outer race of an overrunning clutch, comprises an inner cam surface, and has an outer periphery having a plurality of radially projecting plate-shaped projections extending across a breakage-susceptible area of said outer race for reinforcing, said area, said plate-shaped projections providing improved anchoring of said diecast part at said hub part in a torque-transferring direction.

* * * * *